Oct. 2, 1962   D. P. COCHRANE   3,056,531
DRIBBLE FEEDER
Filed Dec. 17, 1959   3 Sheets-Sheet 2

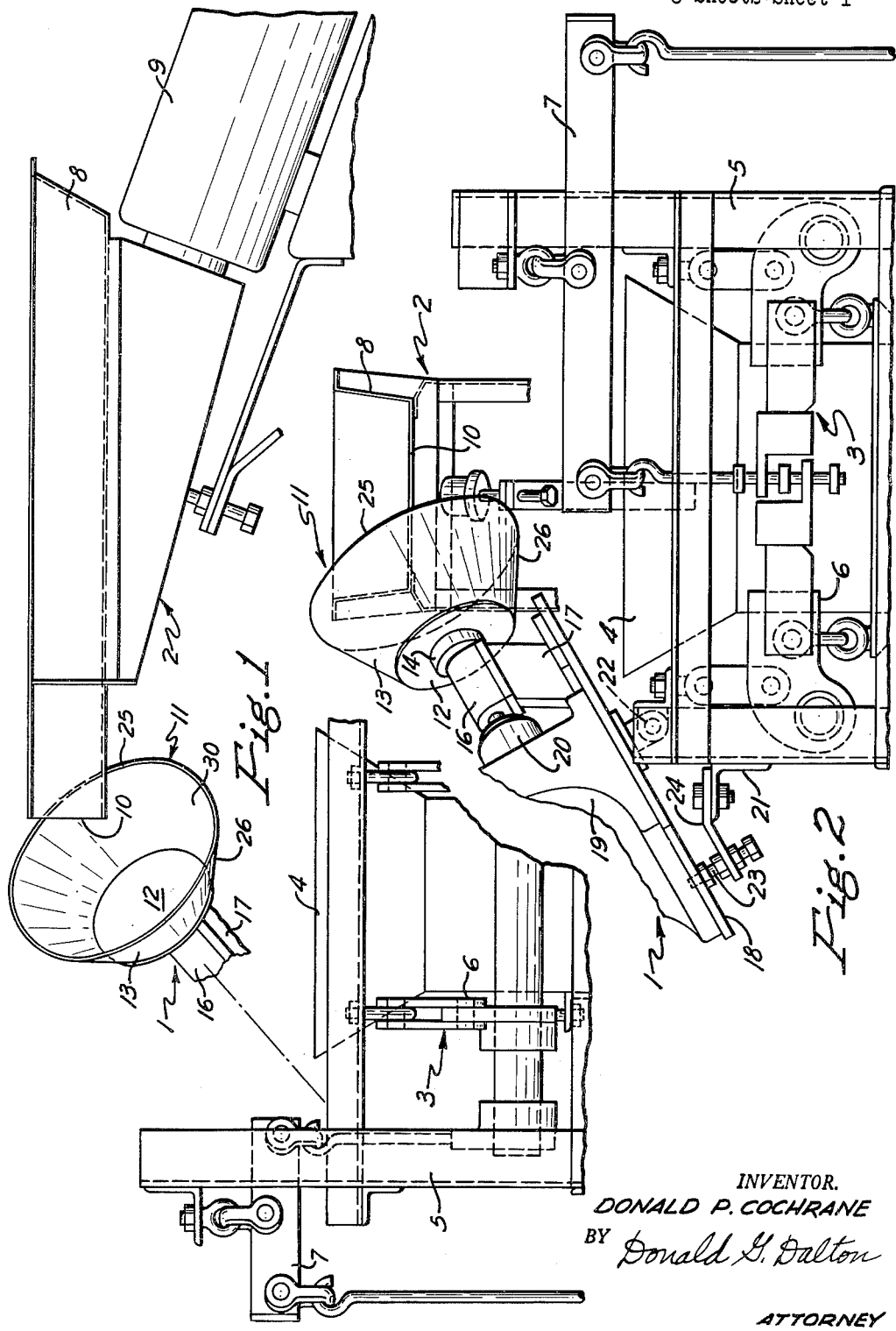

INVENTOR.
DONALD P. COCHRANE
BY Donald H. Dalton
ATTORNEY

Oct. 2, 1962   D. P. COCHRANE   3,056,531
DRIBBLE FEEDER
Filed Dec. 17, 1959   3 Sheets-Sheet 3
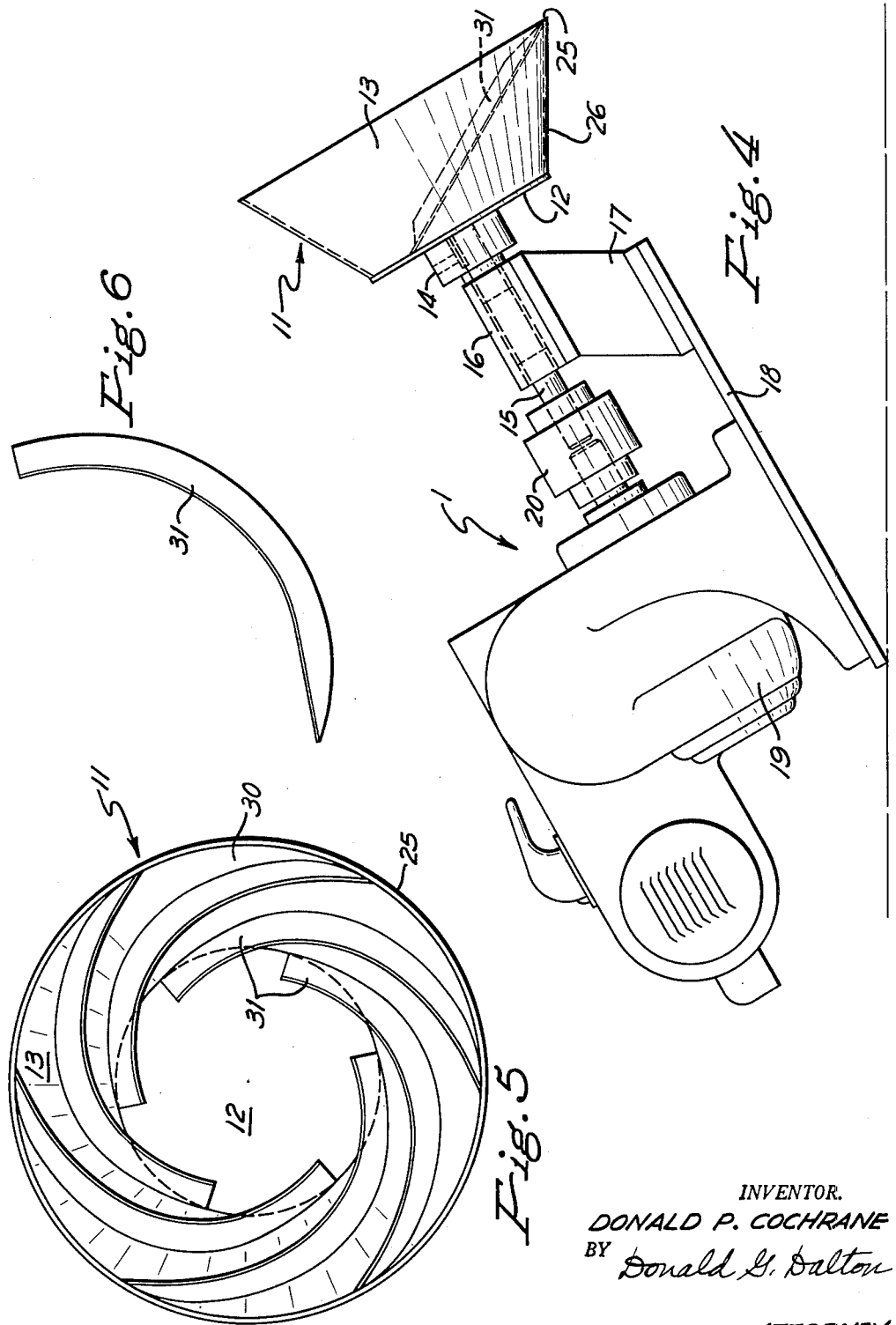
INVENTOR.
DONALD P. COCHRANE
BY Donald G. Dalton
ATTORNEY 3,056,531
DRIBBLE FEEDER
Donald P. Cochrane, Brecksville, Ohio, assignor to United States Steel Corporation, a corporation of New Jersey
Filed Dec. 17, 1959, Ser. No. 860,236
8 Claims. (Cl. 222—77)

This invention relates to apparatus for feeding bulk materials to packaging apparatus in batches or measured quantities of uniform weight. It relates more particularly to a dribble feed mechanism that operates to deliver a final and minor portion of each batch at a relatively slow rate of feed compared to the rate at which the initial and major portion is fed by a scale-controlled main conveyor mechanism. In a manner to be described, the invention resides in a rotating receptacle, which according to a preferred embodiment of the invention is frusto-conical in shape and has spaced tumbling and impeller vanes on the internal surface of its side wall, and is arranged in a position such that it intercepts a portion of a bulk material being delivered by the main conveyor mechanism so that continued rotation of the receptacle after stoppage of the main conveyor is effective to discharge the material therein at a relatively slow rate of feed.

While the invention is adapted to the handling of bulk materials in general, such as nuts, bolts, washers, and the like, it is particularly suited for handling nails which during delivery by a conveyor to batch measuring apparatus cross and collect in commingled masses or clumps. This tendency of nails to collect in clumps presents a troublesome problem in batch measuring apparatus that includes a dribble feed since the delivery of a clump of nails by the dribble feed to the batch weighing mechanism interferes with the accuracy of the weighing operation and frequently results in batches of inaccurate weight. To avoid inaccuracies of this character, various forms of mechanisms for preventing the formation of nail clumps have been proposed and are commonly employed in conventional conveyors for feeding nails to batch weighing apparatus. However, such proposals have usually involved complicated mechanisms and have not proved entirely effective in eliminating inaccuracies in batch weighing operations due to nail clumping which thus continues to be a troublesome problem.

One of the objects of this invention is to provide an improved form of dribble feeder of simplified construction and which in the case of nail handling operations is effective to prevent the collection of nails in clumps and inaccuracies due to their subsequent delivery to the weighing mechanism. To this end, and as indicated above, the invention contemplates a dribble feeder in the form of a receptacle or pan that has a frusto-conical shape and is arranged in the path of gravitational movement of the material to the scale weighing mechanism so that it intercepts a portion of the material being fed thereto, and which upon continued rotation after stoppage of the main conveyor mechanism feeds the material intercepted therein to the weighing mechanism at a dribble rate. A further and related object of the invention is to provide a rotating receptacle of this character with deflector vanes on the internal surface of its side wall that operate during its rotation to tumble and separate the material therein and to impel it in a direction toward the open end thereof for discharge into the weighing mechanism at a dribble rate.

Other objects and advantages of the invention will become apparent from the following description.

In the drawings, there is shown a preferred embodiment of the invention. In this showing:

FIGURE 1 is a side elevational view showing fragmentarily a conventional arrangement of a vibratory feeder and batch weighing apparatus that is provided with a dribble feeder constructed in accordance with the principles of this invention;

FIGURE 2 is an elevational view looking in a direction from the left of FIGURE 1;

FIGURE 4 is a side elevational view of the dribble feeder of this invention;

FIGURE 5 is an enlarged and detail end view of the rotating receptacle or pan shown in the preceding figures and which is taken in a direction looking from the open end thereof; and FIGURE 6 is a side elevational view of one of the tumbling and impeller vanes shown in FIGURE 5.

Figure 3:
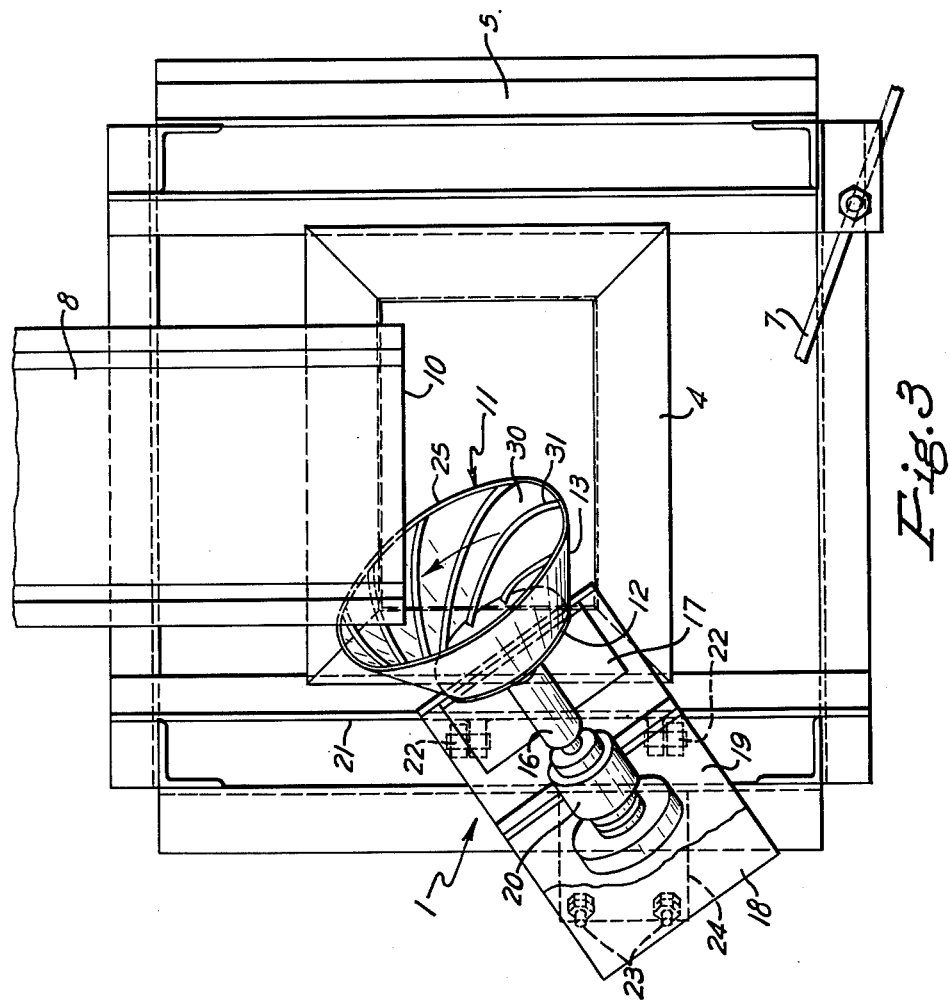
FIGURE 3 is a plan view of the apparatus shown in FIGURES 1 and 2.

The drawings show the dribble feeder of this invention, which is designated as a whole by the numeral 1, in conjunction with a vibratory conveyor 2 that operates to feed bulk materials to a batch weighing mechanism 3. The conveyor 2 and the weighing mechanism 3 being conventional in construction have been shown only fragmentarily and need only be described and referred to generally. The weighing mechanism 3 comprises an upwardly opening hopper 4 that receives the material to be weighed and is supported on a frame 5 by a conventional scale weighing mechanism 6 that includes a scale beam 7. The conveyor 2 comprises a shallow pan 8 that has a channel-shape in cross-section and receives the bulk material to be weighed from a supply chute (not shown). The pan 8 is vibrated by a conventional electrical vibrator 9 so that the material received therein is fed to and discharged from the open end 10 of the pan 8 which is positioned over the hopper 4 so that the discharged material gravitates over a vertical path into the hopper 4. As in conventional constructions, operation of the vibrator 9 is under the control of the scale mechanism 3 which operates to stop its feeding operation after delivery of an initial and major portion, from about 95% to 98% of each batch of material, the remainder of each batch being supplied by a dribble feeder also under the control of the scale mechanism 3.

The dribble feeder 1 of this invention comprises a receptacle or pan 11 of frusto-conical shape that has a circular bottom 12 and an outwardly flaring side wall 13. A concentric connection 14 (FIGURE 4) between the bottom 12 and the end of a drive shaft 15 mounts the pan for rotation about an axis extending centrally thereof. The shaft 14 is rotatably supported by a bearing 16 carried by a bracket 17 mounted on a base plate 18 and is driven by a variable speed drive motor 19 also mounted on base plate 18 through a drive coupling 20. The base plate 18 has an adjustable mounting in a canted position on one side 21 of the frame 5 that is provided by a pair of spaced pivot supports 22 and a pair of adjusting screws 23 carried by a bracket 24 secured to the frame 5. In the canted position of the base plate 18 shown in FIGURES 1–3, the axis of the shaft 14 and pan 11 is disposed at an angle to the vibrating feeder pan 8, in both horizontal and vertical planes, and the open end of the receptacle pan 11 defined by its outer edge 25 is positioned at one side of but in the vertical path over which material gravitates from the discharge end 10 of the feeder pan 8 so that it intercepts a portion of such material. More particularly it will be noted with reference to FIGURE 2 that the axis of the shaft 14 and receptacle 11 extends laterally at an oblique angle relative to a vertical plane passing through the longitudinal center-line of the feeder pan 8 and upwardly with respect to the vertical path of movement of the material toward the weigh-hopper 8. In addition, and with reference to FIGURE 3, it will be noted that the axis of the shaft 14 and receptacle 11 extends at an acute angle relative to the horizontal end 10 of the chute 8 in such manner that the receptacle faces toward the chute end 10 in a direction from one side thereof. In the preferred position of the receptacle 11 shown in FIGURES 1 and 2 of the drawings, the lowermost portion 26 of the side wall 13 occupies a horizontal position so that material received in the receptacle 11 is supported by the side wall 13. By reason of its angularly inclined position, material in the receptacle 11 will be discharged over the edge 25 upon rotation indicated by the arrow in FIGURE 3 of the drawings. Adjustment of the rate of material discharge in this manner may be effected by operating the screw 23 to regulate the position of the lowermost portion 26 of the receptacle 11 with reference to a horizontal plane. The rate of material discharge from the receptacle 11 may be further regulated by varying its speed of rotation by the drive motor 19.

At spaced intervals about the internal surface 30 of the side wall 13, the receptacle 11 is provided with a plurality of tumbling and impeller vanes 31. Each of the impeller vanes 31 is a curved metal strip that extends in an axial direction relative to the receptacle 11 from its outer edge 25 toward its bottom 12. Each of the vanes 31 further has an angular inclination with respect to the axis of rotation of the receptacle 11 which is in a trailing direction with respect to the direction of rotation of the receptacle 11 which is counterclockwise as viewed in FIGURE 3 and as indicated by the arrow. The trailing angle of inclination of each of the impeller vanes 31 is preferably about 60° with respect to the axis of rotation of the receptacle 11 as will be apparent from the single vane shown in dotted lines in FIGURE 4, and this provides a vertically downward slope of about 30° so that nails supported thereon will slide downwardly thereover for discharge when it is in this position. During rotation of the receptacle 11, the impeller vanes 31 operate to agitate the material intercepted therein and resting on the bottom 26 and this action, in the case of nails, operates to break up and prevent the collection of nails therein in commingled masses or clumps. By reason of their trailing angle of inclination with respect to the direction of rotation of the receptacle 11, the vanes 31 operate to impel the nails or other material forwardly over the lowermost portion 26 of the receptacle 11 so that it is discharged over the receptacle edge 25 at a point substantially centrally of the weigh hopper 4.

The receptacle 11 is preferably provided with at least six uniformly spaced vanes as shown in FIGURE 5. However, it will be apparent that a greater number may be used as shown in FIGURE 3, or a smaller number if so desired. The size and shape of both the receptacle 11 and the vanes 31 may of course be varied according to the size of nails to be handled or according to the characteristics of other bulk material to be handled.

In operation, the vibratory feeder 8 is operated to deliver bulk material into the weigh hopper 4 to supply a major portion of from about 95 to 98% of the batch to be supplied to the scale mechanism 6, and its operation is then stopped by the scale mechanism 6 through conventional scale-operated controls for this purpose. The receptacle 11 rotates continuously during this initial feeding operation and accumulates sufficient material by its intercepting action as explained above to make up the remainder of the material to be supplied for each batch to the scale mechanism 6. When the operation of the feeder mechanism 8 is discontinued, the receptacle 11 continues to rotate until sufficient material is delivered to the scale mechanism 6 to make up the required batch which then operates through conventional dribble feeder controls to stop rotation of the receptacle 11.

While one embodiment of my invention has been shown and described it will be apparent that other adaptations and modifications may be made without departing from the scope of the following claims.

I claim:
1. In material feeding apparatus including a conveyor for feeding bulk material and discharging it for gravitational movement over a vertical path, a dribble feed mechanism comprising a receptacle having a conically-shaped side wall, means mounting said receptacle for rotation about an axis extending centrally thereof and angularly inclined in an upward direction with respect to said vertical path of material movement, said conically-shaped side wall having an outer edge defining a material receiving opening facing upwardly and arranged in said path of material movement for intercepting a portion of the material gravitating from said conveyor and having its lowermost portion lying in a substantially horizontal plane, and means for rotating said receptacle to discharge the material therein for gravitational movement over said vertical path.

2. A dribble feed mechanism as defined in claim 1 characterized by the provision of a plurality of deflector vanes arranged at spaced intervals about the internal surface of said side wall and extending in an axial direction inwardly from said side wall outer edge, said vanes operating during rotation of said receptacle to tumble material received therein.

3. A dribble feed mechanism as defined in claim 2 characterized by said vanes respectively having an angular inclination relative to said axis such that they operate in response to rotation of said receptacle to impel the material therein toward said material receiving opening.

4. A dribble feed apparatus comprising, in combination, a conveyor for feeding bulk material and discharging it for gravitational movement over a vertical path, a receptacle having a circular bottom and a frusto-conical side wall projecting outwardly from said bottom, means mounting said receptacle for rotation about an axis extending centrally thereof and angularly inclined in an upward direction with respect to said vertical path of material movement and with the lowermost portion of said side wall lying in a substantially horizontal plane, said receptacle being arranged in a position such that it intercepts a portion of the material gravitating from said conveyor over said vertical path, and means for rotating said receptacle to discharge the material therein for gravitational movement over said vertical path.

5. A dribble feed apparatus as defined in claim 4 characterized by the provision of a plurality of deflector vanes arranged at spaced intervals about the internal surface of said side wall and respectively extending in an angularly inclined direction relative to said axis of rotation from the outer edge of said side wall towards said bottom, said vanes operating during rotation of said receptacle to tumble the material therein and their angular inclination being such that they operate to move the material therein outwardly over said side wall for gravitational movement over said vertical path.

6. An apparatus as defined in claim 4 characterized by said receptacle mounting means including means for adjusting the said angular inclination of said axis of rotation and thereby the angular position of said side wall lowermost portion relative to a horizontal plane.

7. A dribble feed apparatus comprising, in combination, a vibratory feeder including a horizontal pan of channel-shape over which bulk material is fed to one end thereof for gravitational discharge movement over a vertical path, a receptacle having a circular bottom and a frusto-conical side wall projecting outwardly from said bottom, means mounting said receptacle for rotation about an axis extending centrally thereof and in a position facing laterally relative to the longitudinal center-line of said pan and upwardly relative to said vertical path such that it intercepts a portion of the material gravitating from said feeder pan over said vertical path, a plurality of deflector vanes arranged at spaced intervals about the internal surface of said side wall and respectively extending in an angularly inclined direction relative to said axis of rotation from the outer edge of said side wall toward said bottom, and means for rotating said receptacle about said axis of rotation, said vanes operating during rotation of said receptacle to tumble the material therein and their angular inclination being such that they operate to move the material therein outwardly over said side wall for gravitational movement over said vertical path.

8. A dribble feed apparatus as defined in claim 7 characterized by said receptacle mounting means including means for adjusting the angular position of its said axis of rotation relative to said vertical path.

References Cited in the file of this patent
UNITED STATES PATENTS

| | | |
|---|---|---|
| 2,097,551 | Garlinghouse | Nov. 2, 1937 |
| 2,544,575 | Weber | Mar. 6, 1951 |